United States Patent
Jiang (10) Patent No.: US 12,234,038 B2
(45) Date of Patent: Feb. 25, 2025

(54) RECOVERABLE ROCKET AND AN ASSOCIATED RECOVERY METHOD

(71) Applicant: Jiantang Jiang, Zhongshan (CN)

(72) Inventor: Jiantang Jiang, Zhongshan (CN)

(*) Notice: Subject to any disclaimer, the term of this patent is extended or adjusted under 35 U.S.C. 154(b) by 0 days.

(21) Appl. No.: 18/356,394

(22) Filed: Jul. 21, 2023

(65) Prior Publication Data

US 2024/0208674 A1 Jun. 27, 2024

(30) Foreign Application Priority Data

May 30, 2023 (CN) .......................... 202310623827.7

(51) Int. Cl.
| | | |
|---|---|---|
| B64G 1/62 | (2006.01) | |
| B64G 1/00 | (2006.01) | |
| B64G 1/40 | (2006.01) | |
| F02K 9/62 | (2006.01) | |
| F02K 9/74 | (2006.01) | |
| F02K 9/78 | (2006.01) | |

(52) U.S. Cl.
CPC ............. *B64G 1/006* (2023.08); *B64G 1/401* (2013.01); *B64G 1/62* (2013.01); *B64G 1/623* (2023.08); *F02K 9/62* (2013.01); *F02K 9/74* (2013.01); *F02K 9/78* (2013.01)

(58) Field of Classification Search
CPC .......... B64G 1/006; B64G 1/401; B64G 1/62; B64G 1/623; B64G 1/625; F02K 9/62; F02K 9/74; F02K 9/78
See application file for complete search history.

(56) References Cited

U.S. PATENT DOCUMENTS

| | | | | |
|---|---|---|---|---|
| 3,252,673 | A * | 5/1966 | Reichert ................. | B64C 29/02 244/76 R |
| 5,595,358 | A * | 1/1997 | Demidov ................ | B64C 29/02 244/12.6 |
| 5,842,665 | A * | 12/1998 | McKinney .............. | B64C 29/02 244/171.3 |
| 8,408,497 | B2 * | 4/2013 | Boelitz .................. | B64G 1/002 244/158.9 |
| 8,678,321 | B2 * | 3/2014 | Bezos .................... | B64G 1/623 244/158.9 |
| 8,844,876 | B2 * | 9/2014 | Prampolini ............ | B64G 1/401 244/158.9 |
| 9,457,918 | B2 * | 10/2016 | Hand ...................... | B64G 1/62 |
| 2019/0055035 | A1 | 2/2019 | Knudsen et al. | |
| 2021/0372291 | A1 * | 12/2021 | NakaMats ............... | B64D 5/00 |
| 2022/0081130 | A1 | 3/2022 | Baekby Bjarnoe | |
| 2022/0135259 | A1 | 5/2022 | Knudsen et al. | |

* cited by examiner

*Primary Examiner* — Kyle Robert Thomas
(74) *Attorney, Agent, or Firm* — Hemisphere Law, PLLC; Zhigang Ma (57) ABSTRACT

A recoverable rocket and an associated recovery method are disclosed. A recoverable rocket comprises a rocket body and at least two side wings. One end of each side wing is connected to the casing of the rocket body, and the other end is connected to a deceleration mechanism; the deceleration mechanism comprises a turbine engine and a propeller. The propeller is arranged below the turbine engine. The propeller is connected to the drive shaft of the turbine engine, and the turbine engine drives the propeller to rotate in the air to generate a thrust which decelerates the rocket during recovery. The rocket body comprises a structural system, a propulsion system, a control system and a set of landing legs. The advantage of this invention is that it realizes the recovery of rockets.

13 Claims, 6 Drawing Sheets

RECOVERABLE ROCKET AND AN ASSOCIATED RECOVERY METHOD

TECHNICAL FIELD

The invention relates to the field of aerospace, in particular to a recoverable rocket and a recovery method thereof.

BACKGROUND OF THE INVENTION

The cost of transporting things into space as always been high. The cost of transporting a 1 kg of object into space is about 10,000 to 20,000 US dollars, because the conventional rockets are used only once. The fuel cost accounts for only about ½₀₀ of the total cost; however, the most valuable parts, such as the rocket engines, are abandoned. In addition, more and more private enterprises at home and abroad are also involved in space activities, such as experiencing short-term weightlessness and even space tourism. The market demand is large and growing fast.

To sum up, if the rocket cannot be recovered and reused, not only the cost remains too high, but also the crash disposal of the rockets causes damage to the environment, and even threatens the safety of life and property on the ground. It seriously restricts the development of rocket technology and space exploration.

DETAILED DESCRIPTION

In order to solve the deficiencies of the prior art, the present invention discloses a recoverable rocket and a recovery method thereof, which can effectively realize the recovery of the rocket.

A recoverable rocket comprises a rocket body and at least two side wings. One end of each side wing is connected to the casing of the rocket body, and the other end is connected to a deceleration mechanism; the deceleration mechanism comprises a turbine engine and a propeller. The turbine engine is connected to the rocket body through the ducts arranged in the side wing, and the rocket body supplies the energy required for the turbine engine to work. The propeller is arranged below the turbine engine. The propeller is connected to the drive shaft of the turbine engine, and the turbine engine drives the propeller to rotate in the air to generate a thrust which decelerates the rocket during recovery. The rocket body comprises a structural system, a propulsion system, a control system and a set of landing legs.

The structural system is the basic frame of the rocket, it maintains the shape of the rocket, connects and combines all the components on the rocket into a whole. The propulsion system comprises several rocket engines arranged at the bottom of the rocket body, a fuel tank, an oxidant tank and propellant pumps, etc. The control system comprises a guidance and navigation system, an attitude control system, a power supply and distribution system, and the software and hardware systems that connect all actuators and ensures the normal operation of each actuator.

The guidance and navigation system is used to detect the position of the rocket and guide the rocket to move along the predetermined trajectory. The attitude control system is used to detect and adjust the attitude of the rocket so as to keep the rocket in the correct attitude. The power supply and distribution system is used to provide electric energy for devices requiring electricity such as various instruments and sensors.

The attitude control system also comprises a liquid nitrogen attitude adjustment system, and the liquid nitrogen attitude adjustment system comprises a liquid nitrogen tank, ducts, jet thrusters and related sensors. It monitors and adjusts the three attitude angles (roll, yaw and pitch) of the rocket to ensure that the attitude of the rocket meets the needs of the mission.

The bottom of the rocket body is equipped with a set of landing legs, which work as a base for supporting and maintaining the stability of the rocket. The landing legs are foldable and they retract during the ascent of the rocket and deploy when landing on the ground.

One end of the side wing is connected to the upper part of the rocket body and the connection is positioned obviously higher than the center of gravity of the rocket body. This helps to maintain the rocket in a suitable attitude for the deceleration mechanisms to decelerate the rocket during the recovery. Similar to a flying shuttlecock, the part subjected to greater resistance tends to moves backward while the center of gravity forward. During the descent of the rocket, the interaction between the deceleration mechanisms on the side wings and the air produces aerodynamic drag that pulls the rocket body to decelerate. When the drag acts on a position significantly higher than the center of gravity of the rocket body, the rocket tends to reorient to a bottom-first attitude (the rocket engines at the rocket's bottom point to the direction of its motion). This attitude is most suitable for all deceleration mechanisms including the rocket engines to decelerate the rocket. The side wings can also be equipped with multiple deceleration mechanisms, or other types of deceleration mechanisms, such as parachutes, etc.

The turbine engine comprises a turbine, a combustion chamber and a drive shaft. The turbine engine obtains the oxidant and fuel from the rocket body through the ducts arranged in the side wing. The high-temperature and high-pressure gas generated from the combustion reaction in the combustion chamber drives the turbine to rotate to do work. The propeller arranged below the turbine engine is driven by the drive shaft of the turbine engine.

A recovery method is also disclosed in the present invention. The recovery method usually includes the following steps in the process of recovering a rocket:

Step 1—To utilize the interaction between the deceleration mechanisms on the side wings and the air to reorient the rocket to an attitude which is suitable for each deceleration mechanism to decelerate the rocket.

Take it as an example when the rocket rises to the highest point and turn to falls down vertically; that is the beginning of the recovery process, but the attitude of the rocket is not necessarily exactly vertical at this moment. The deceleration mechanisms on the side wings are activated to adjust the attitude of the rocket. For example, it unfolds the propellers, starts the turbine engines to drive the propellers to rotate. The air density increases as the rocket falls, and the aerodynamic drag acts on the propellers increases accordingly. Because the side wings are installed at a position much higher than the center of gravity of the rocket body, the rocket tends to reorient itself to a vertical attitude. If other deceleration mechanisms have also been installed on the side wings, such as parachutes, the parachutes will also be deployed in this step, and the aerodynamic resistance on the parachutes will also help the rocket to orient to a vertical attitude. This attitude is most suitable for propellers, parachutes and the rocket engines to decelerate the rocket.

Step 2—To control the powers of the turbine engines, making sure the speed of the rocket meets the requirements for a soft landing when the rocket gets near the ground.

The air density increases with the decrease of altitude; the propellers will accordingly obtain greater lift from the air to decelerate the rocket. The control system monitors and adjusts the powers of the turbine engines according to the speed and altitude of the rocket, making sure the descent rate of the rocket can be reduced to meet the requirements for a soft landing when it gets near the ground, avoiding to crash into the ground out of control.

Step 3—To move the rocket to the landing site.

When the rocket gets near the ground, the control system will set an optimal route to get to the landing site according to the positions of the landing site and the rocket itself; then the rocket will move to the landing site with its ability of horizontal and vertical maneuver.

Step 4—To land the rocket.

Having arrived at the landing site, it will first deploy the landing legs mounted at the bottom of the rocket body, then slowly descend onto the ground and turn off the turbine engines. The entire recovery process is finished.

In step 1 described above, when it is impossible to adjust the attitude of the rocket by the interaction between the deceleration mechanisms on the side wing and the air, or the attempt to adjust the attitude is unsuccessful, the liquid nitrogen attitude adjustment system will be activated to reorient the rocket to the required attitude.

In some cases, the rocket may be in a high vacuum far away from the ground, and the attitude adjustment before deceleration by the rocket engines cannot be realized by the interaction between the deceleration mechanisms and the atmosphere. Or in some cases, the rocket rolls violently due to accidents when releasing the load, the interaction between the deceleration mechanisms and the air may not be strong enough to adjust the rocket's attitude within the required time. In these cases, it is necessary to activate the liquid nitrogen attitude adjustment system to help to adjust its attitude to make sure subsequent steps can be carried out smoothly.

In step 1 or step 2 described above, if the rocket's control system thinks that the rocket is moving too fast and that threatens the structural safety of the rocket or threatens the goal of soft landing, it will ignite the rocket engines to decelerate the rocket, making sure its speed is within the required range.

The control system monitors the parameters such as the altitude and speed of the rocket, and makes judgments based on its own conditions. For example, when the descent is too fast, the powers of the turbine engines may not be high enough to ensure that the rocket speed can be reduced to meet the landing requirements before getting near the ground; some vulnerable parts may get broken due to overload or due to heat generated from friction with the air. In this case, the rocket engines will be ignited to decelerate the rocket to a speed within a safe range.

Step 2 and step 3 described above can be carried out synchronously, so that the rocket can move towards the landing site during the descent.

During the descent, not only the deceleration mechanisms decelerate the rocket, the control system also changes the trajectory of the rocket with its horizontal maneuver ability, so that the rocket can move towards the landing site while falling; at least it minimizes the deviation from the landing site.

Compared with prior art, the present invention can recover the rockets for reuse, that can lower the cost for transporting thing into space.

The components in the drawings are labeled as follows; 1 rocket body; 11 landing leg; 12 rocket engine; 2 side wing; 21 rotating device; 3 turbine engine; 31 turbine; 32 combustion chamber; 33 drive shaft; 34 fairing; 4 propeller; 41 first folding joint; 42 protective tube; 43 propeller blade; 5 parachute mechanism; 51 deceleration plank; 52 second folding joint; 53 steel wire; 54 grid frame; 541 air vent; 542 hole; 55 flow-adjusting vane; 551 vane bearing.

DETAILED DESCRIPTION OF THE PREFERRED EMBODIMENTS

It will be apparent to those skilled in the art that various modifications and variations can be made without departing from the spirit and scope of the disclosure. It should be understood that the drawings and embodiments are not intended to limit the scope of the present invention in any way. Thus, it is intended that the present disclosure covers the modifications and variations of this disclosure.

Embodiment 1

Figure 1:
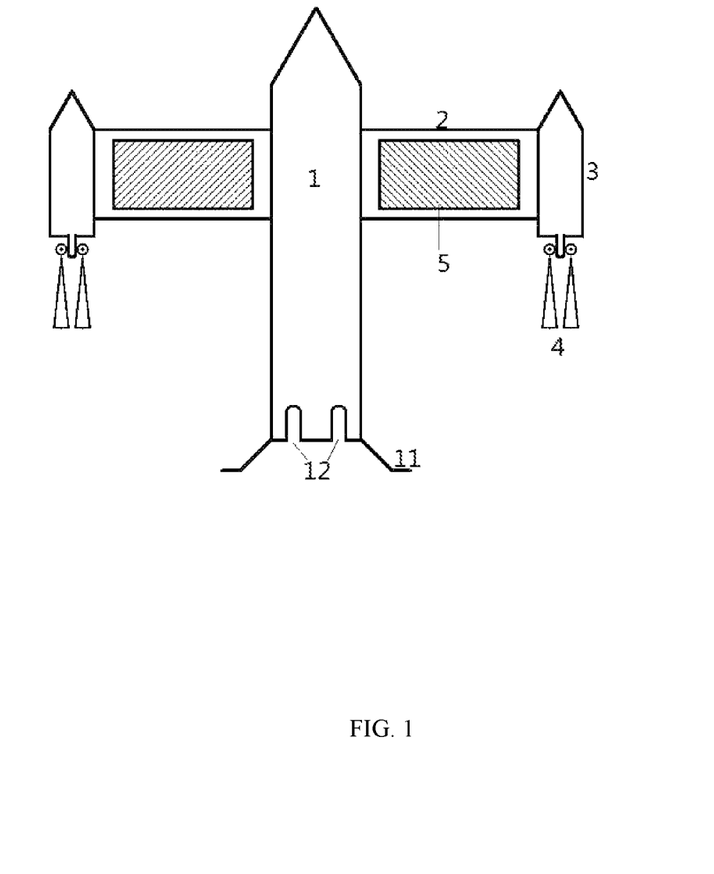
FIG. 1 is a schematic diagram illustrating the front view of a recoverable rocket of the present invention (Embodiment 1)

As shown in FIG. 1, a recoverable rocket comprises a rocket body 1 and two side wings 2. One end of each side wing 2 is connected to the casing of the rocket body 1, and the other end is connected to a deceleration mechanism; the deceleration mechanism comprises a turbine engine 3 and a propeller 4. The turbine engine 3 is connected to the rocket body 1 through the ducts arranged in the side wing 2, and the rocket body 1 supplies the energy required for the turbine engine 3 to work. The propeller 4 is arranged below the turbine engine 3. The propeller 4 is connected to the drive shaft 33 of the turbine engine 3 (FIG. 2), and the turbine engine 3 drives the propeller 4 to rotate in the air to generate a thrust which decelerates the rocket during recovery. The rocket body 1 comprises a structural system, a propulsion system, a control system and a set of landing legs 11.

Figure 2:
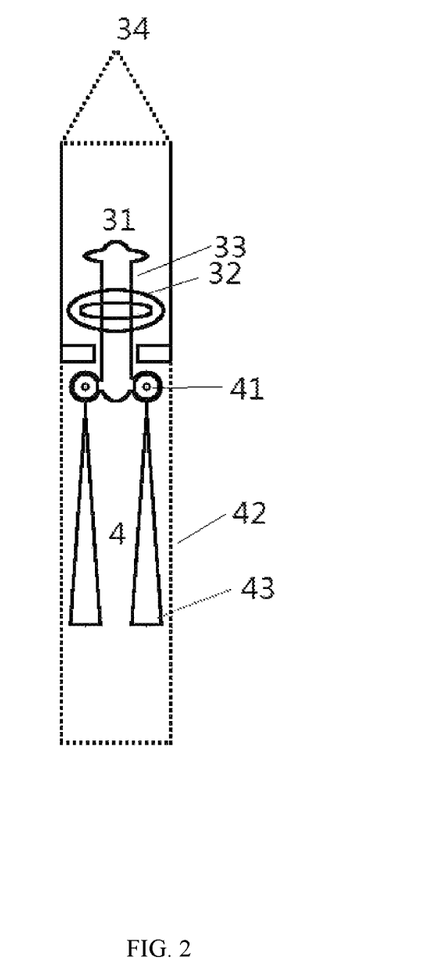
FIG. 2 is a schematic diagram illustrating a turbine engine of the present invention.

As shown in FIG. 2, it is a turbine engine 3 without an air compressor; the oxidant and fuel required for the turbine engine 3 to work are provided by the pumps installed in the rocket body 1, the pumps separately control the flows of the oxidant and the fuel to adjust the power of the turbine engine 3. The turbine engine 3 comprises a turbine 31, a combustion chamber 32 and a drive shaft 33. The turbine engine 3 obtains the oxidant and fuel from the rocket body 1 through the ducts arranged in the side wing 2. The high-temperature and high-pressure gas generated from the combustion reaction in the combustion chamber 32 drives the turbine 31 to rotate to do work. A propeller 4 arranged below the turbine engine 3 is driven by the drive shaft 33 of the turbine engine 3. A conical fairing 34 is arranged on the top of the turbine engine 3, the fairing 34 protects the turbine engine 3 and reduces aerodynamic resistance during the ascent of the rocket. When the recovery process starts, the fairing 34 will be jettisoned to allow combustion exhaust to be discharged from the top.

In this embodiment, the propulsion system of the rocket body 1 adopts liquid oxygen as the oxidant and kerosene as the fuel. The temperature caused by fuel burning in pure oxygen tends to be too high and shorten the operating life of the turbine engine 3. The reaction temperature can be lowered by deviating from the best ratio of oxygen to kerosene for complete combustion, such as injecting excess oxygen or injecting excess kerosene into combustion chamber 32, so that the reaction temperature can be limited within a safe range required for the turbine engine 3 to operate stably.

The propeller 4 is a folding propeller, and a first folding joint 41 is arranged between the root of each blade 43 and the drive shaft 33 of the turbine engine 3. When not working, all the blades are folded and parallel to the drive shaft 33. Each first folding joint 41 comprises a spring inside, and the elasticity of the spring makes the blade 43 tend to unfold when no external force constrains it; the blade 43 can only be kept folded with a certain external force. There is a protective tube 42 outside the propeller 4, and the protective tube 42 keeps the blades 43 folded. The protective tube 42 can also reduce the air resistance acting on the propeller during the ascent of the rocket; when the process of the rocket recovery starts, the protective tube 42 will be jettisoned, then the propeller blades 43 will unfold and the propeller 4 can be driven to rotate by the drive shaft 33.

We can also adopt another way to unfold the propeller blades 43. Each first folding joint 41 is connected to an electric drive mechanism, and the electric drive mechanism can push the blade from folded to unfolded.

Figure 3:
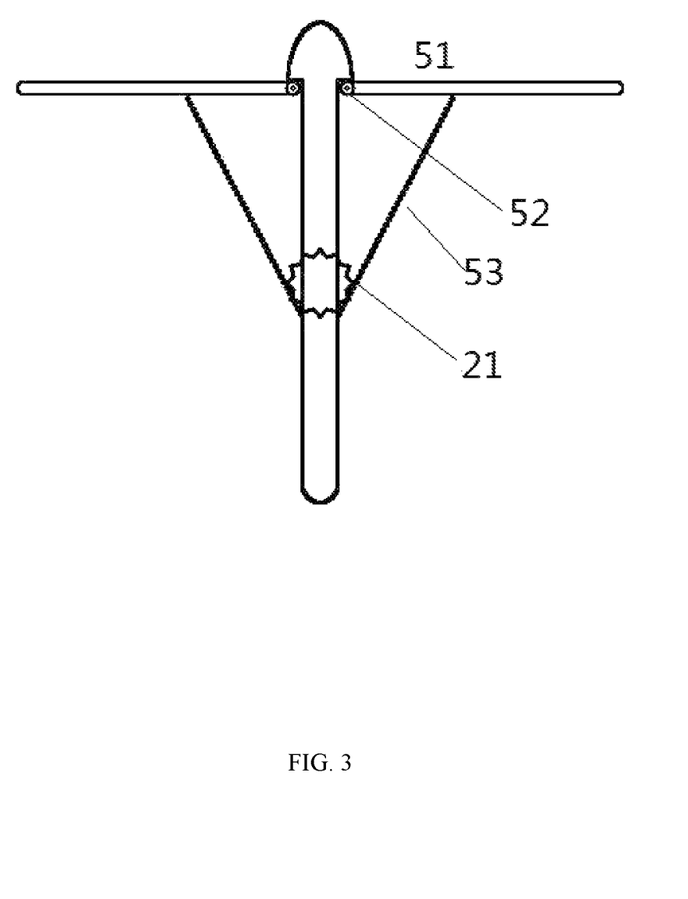
FIG. 3 is a schematic diagram illustrating a parachute mechanism of the present invention.

As shown in FIG. 3, a rotating device 21 is arranged between the side wing 2 and the turbine engine 3; the rotating device 21 can rotate the turbine engine 3 with respect to the side wings 2, which makes the direction of the airflow generated by the propeller 4 adjustable within a certain angle range. With that, the propeller 4 can generate not only upward thrust but also generates thrust for the rocket body 1 to rotate around its own central axis. That enables the rocket to move in all directions in the air with the thrust of the propellers 4 on the two side wings 2.

When it comes to rocket recovery, the first-stage rocket of a multi-stage rocket is most commonly recovered; here we take the recovery of a first-stage rocket as an example. When the first-stage rocket has reached the predetermined altitude and has separated from the second-stage rocket, the first-stage rocket continues to rise inertially for a while following its ballistic trajectory, and turns to descend after reaching a certain height. The first-stage rocket is recovered through the following steps.

Step 1—To reorient the rocket to a nearly vertical attitude.

The control system first jettisons the protective tubes 42 of the propellers 4 to allow the propeller blades 43 to unfold, and also jettisons the fairings 34 of the turbine engines 3 and then starts the turbine engines 3 to drive the propeller 4 to rotate. The air is extremely thin in the upper atmosphere, so driving the propellers 4 is not very energy-consuming, just little more than idling. The air density increases with the altitude decreases, the interactions between the propellers 4 and the air become accordingly greater as the rocket descends. The side wings 2 will move backward and the center of gravity of the rocket body 1 will move forward, reorienting the rocket to a vertical attitude; that is, the rocket engines 12 at the bottom of rocket body 1 point to the direction of the rocket's motion.

Step 2—To control the powers of the turbine engines 3, making sure the speed of the rocket meets the requirements for a soft landing when the rocket gets near the ground.

The air density increases with the decrease of altitude; the propellers 4 will accordingly obtains greater lift from the air to more effectively decelerate the rocket. The control system monitors and adjusts the powers of the turbine engines 3 according to the speed and altitude of the rocket, making sure the descent rate of the rocket can be reduced to around 0 meter per second when it gets near the ground. The main task of this step is to decelerate the rocket; however, at the same time, the rocket can also move towards the landing site with its horizontal maneuver ability during the descent, so that it can be as close as possible to the landing site when it gets near the ground.

Step 3—To move the rocket to the landing site.

When the rocket gets near the ground, it is not exactly right above the landing site in most cases. The rocket can hover in the air by the thrust of the propellers 4. The control system will set an optimal route to get to the landing site according to the positions of the landing site and the rocket itself; then the rocket will move to the landing site with its ability of horizontal and vertical maneuver. In this embodiment, the rocket has only two side wings. By adjusting the thrust of the propellers 4 on both side wings and cooperating with a rotating device 21 between the side wing 2 and the turbine engine 3, the rocket is able to move horizontally.

Step 4—To land the rocket.

Having arrived at the landing site, it will first deploy the landing legs 11 mounted at the bottom of the rocket body 1, then slowly descend onto the ground, turn off the turbine engines 3. The entire recovery process is finished.

In addition, the control system is always monitoring the parameters such as the altitude and speed of the rocket. In step 1 and step 2 described above, if the rocket's control system thinks that the rocket is moving too fast and that threatens the structural safety of the rocket or threatens the goal of soft landing, it will ignite the rocket engines 12 at the bottom of the rocket body 1 to decelerate the rocket to insure its speed is within the required range.

In this embodiment, another deceleration mechanism can also be installed on each side wing 2 to enhance the deceleration effect. The deceleration mechanism comprises one or more parachute mechanisms 5, and a parachute mechanism 5 comprises a pair of deceleration planks 51 installed on both sides of the side wing 2. One end of the deceleration plank 51 is connected to the upper half of the side wing 2 with a second folding joint 52; the second folding joint 52 comprises a drive device, the drive device can push the deceleration plank 51 from folded to unfolded. The deceleration plank 51 is alongside the side wing 2 when it is folded, so as to reduce the air resistance during the ascent of the rocket. During the recovery of the rocket, the deceleration planks 51 will be unfolded, and the air resistance acting on them will be utilized to decelerate the rocket.

One or more steel wires 53 can also be arranged on each deceleration plank 51 to connect with the side wing 2, and the side wing 2 obliquely pulls the unfolded deceleration plank 51 through the steel wires 53. With the steel wires 53, the air pressure on the deceleration plank 51 is partially transferred to the side wing 2 to prevent the second folding joint 52 from being damaged due to excessive torsion; that also helps to reduce the weight of the deceleration plank 51.

The parachute mechanism 5 installed on the side wing 2 described above can also be installed in the vacant position of the casing of the rocket body 1, and the rocket casing should be regarded as an equivalent replacement of the side wing 2. Similar to installation on the side wing 2, when the parachute mechanism 5 is install on the casing of the rocket body 1, the deceleration planks 51 are alongside the casing of the rocket body 1 when folded, and they will unfold when working. The steel wires 53 are arranged on the deceleration planks 51 to connect with the rocket body 1 and the casing of the rocket body 1 obliquely pulls the unfolded deceleration planks 51 through the steel wires 53.

The parachute mechanisms 5 are also deployed in step 1 of the rocket recovery process described above. Its advantages are as follows:

1. At the initial stage of the rocket recovery, the air resistance acting on the parachute mechanisms 5 also facilitates reorienting the rocket body 1 to a vertical attitude.

2. The parachute mechanisms 5 also can directly decelerate the rocket, prolonging the time of the descent of the rocket; this also prolongs the working time of the propellers 4 in the air, indirectly increasing the deceleration effect of the propellers 4 on the rocket.

3. A single parachute mechanism with a large area and multiple parachute mechanisms with a small area are optional. The advantage of using multiple small parachute mechanisms is that even if one of them gets broken, it will not cause the fatal failure of the mission.

Figure 4:
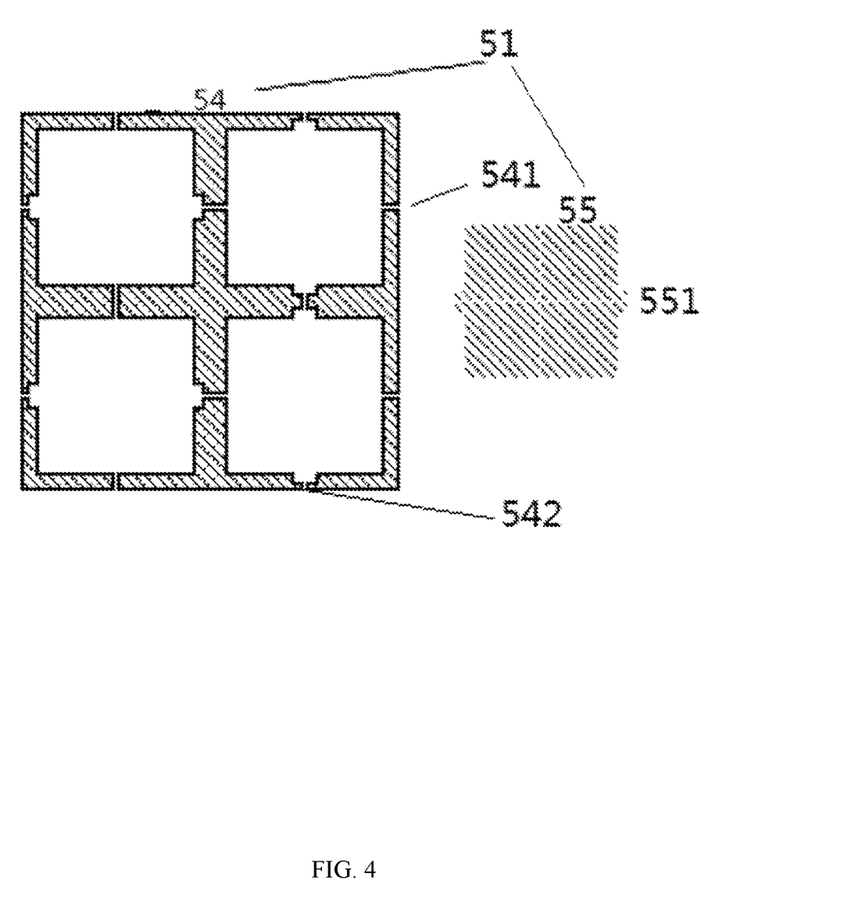
FIG. 4 is a schematic diagram illustrating the structure of a deceleration plank of the present invention.

As shown in FIG. 4, in this embodiment, each deceleration plank 51 of the parachute mechanism 5 comprises a grid frame 54 and one or more flow-adjusting vanes 55; there are one or more square air vents 541 on the grid frame 54, Each air vent 541 is configured with a flow-adjusting vane 55, and each flow-adjusting vane 55 comprises a vane bearing 551. The inner wall of each air vent 541 has two holes 542 matching the vane bearing 551, and the vane bearing 551 is connected to an electric mechanism, the rotation of the electric mechanism can change the angle of the flow-adjusting vane 55; thus, the direction and magnitude of the air pressure caused by the airflow flowing through the air vent 541 acting on the flow-adjusting vane 55 can be adjusted by controlling the angle of the flow-adjusting vane 55.

The grid frame 54 can be configured with a plurality of air vents 541, and the vane bearings 551 of the flow-adjusting vanes 55 of some air vents 541 are arranged perpendicular to the vane bearings 551 of the flow-adjusting vanes 55 of other air vents 541. This arrangement can generate a resultant force with a wider angle range by individually adjusting the angle of each flow-adjusting vane 55. Thus, to a certain extent, the motion direction and the attitude of the rocket can be adjusted by the parachute mechanism 5 during the recovery, allowing the rocket to approach the landing site while falling.

In this embodiment, the drive device arranged in each second folding joint 52 of the parachute mechanism 5 adopts a one-way drive mode. The movement of the drive device only pushes the deceleration plank 51 from folded to unfolded; when the drive device retracts, the deceleration plank 51 will not be pulled back from unfolded to folded. Therefore, when the drive device retracts, how the deceleration plank 51 will move is determined by the external force acting on it. After all the deceleration planks 51 are unfolded at the beginning of the rocket recovery, a continuous upward air pressure is acting on them as the rocket is falling, that keeps the deceleration planks 51 unfolded; however, the upward air pressure acting on them decreases as the rocket decelerates. When the rocket is slowed down to around 0 meter per second, the upward air pressure acting on the deceleration planks 51 is nearly zero; considering the rotating propellers 4, the air above in fact is flowing downward; the net air pressure acting on the deceleration planks 51 becomes downward. At this time, the deceleration planks 51 should be preferably folded up. The advantage of the one-way drive mode of the second folding joint 52 is that when the external force acting on the deceleration plank 51 tends to fold it up, the deceleration plank 51 can fold up in response to the external force.

Embodiment 2

Figure 5:
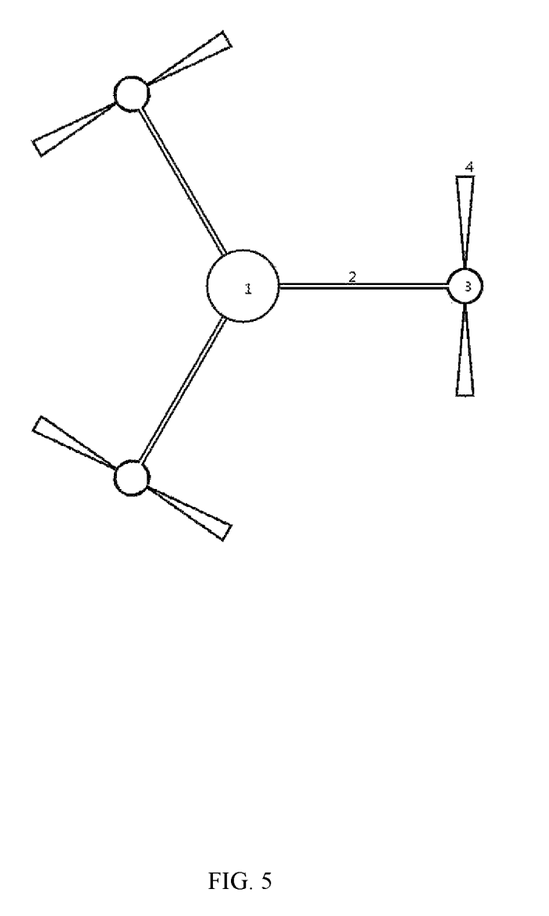
FIG. 5 is a schematic diagram illustrating the top view of a recoverable rocket of the present invention (Embodiment 2)

As shown in FIG. 5, a recoverable rocket comprises a rocket body 1 and three side wings 2. One end of each side wing 2 is connected to the casing of the rocket body 1, and the other end is connected to a deceleration mechanism; the deceleration mechanism comprises a turbine engine 3 and a propeller 4. The turbine engine 3 is connected to the rocket body 1 through the ducts arranged in the side wing 2, and the rocket body 1 supplies the energy required for the turbine engine 3 to work. The propeller 4 is arranged below the turbine engine 3. The propeller 4 is connected to the drive shaft 33 of the turbine engine 3 (FIG. 2), and the turbine engine 3 drives the propeller 4 to rotate in the air to generate a thrust which decelerates the rocket during recovery. The rocket body 1 comprises a structural system, a propulsion system, a control system and a set of landing legs 11.

There are two differences between this embodiment and embodiment 1:

1, There are only two side wings 2 mounted on the rocket body 1 in embodiment 1; but there are three side wings in this embodiment.

2. In embodiment 1, at least one side wing 2 has to be equipped with a rotating device 21 that can rotate the turbine engine 3, so as to enable the rocket to move freely in different directions. However, any of the side wings 2 is not necessarily equipped with the rotating device 21 in this embodiment; if one or more side wings 2 are equipped with the rotating devices 21, the rocket will be more maneuverable. Even if no rotating device 21 is installed on any side wing 2, the cooperation of three propellers 4 can also tilt and move the rocket in any direction.

The steps of rocket recovery in this embodiment are the same as the steps described in embodiment 1. In this embodiment, each side wing 2 can also be equipped with a parachute mechanism 5, and the structure, purpose and use method of the parachute mechanisms 5 are the same as description in embodiment 1. Compared with a recoverable rocket equipped with two side wings 2, the design with three side wings 2 is more suitable for heavy rockets; and the design of three or more side wings 2 enables the rocket to move freely in different horizontal directions without the Rotating device 21 between the side wing 2 and the turbine engine 3.

In addition, the description of this embodiment can be applied to other cases in which more than three side wings are installed on the rocket body.

Embodiment 3

Figure 6:
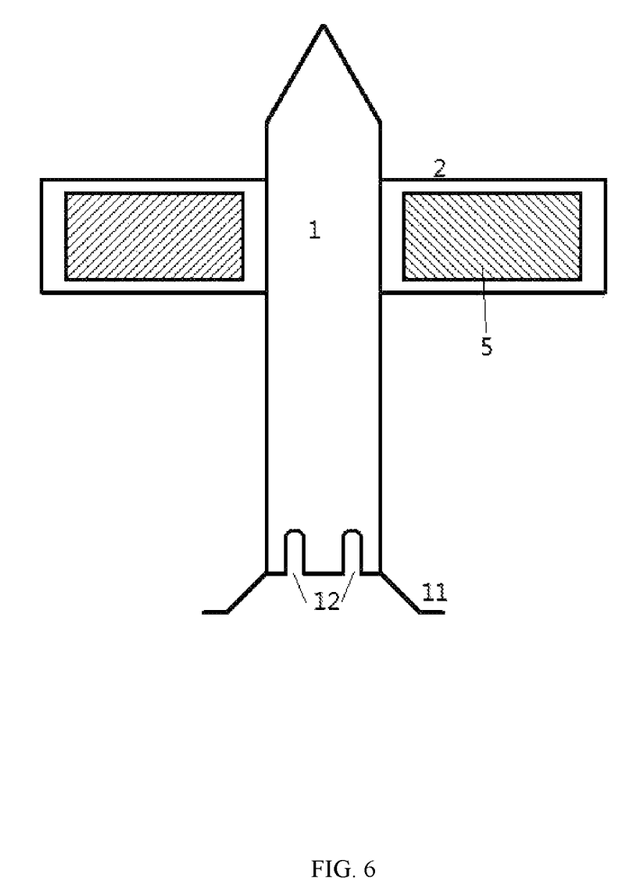
FIG. 6 is a schematic diagram illustrating the front view of a recoverable rocket of the present invention (Embodiment 3).

As shown in FIG. 6, a recoverable rocket comprises a rocket body 1 and two side wings 2, and the rocket body 1 comprises a structural system, a propulsion system, a control system and a set of landing legs 11. One end of each side wing 2 is connected to the upper half of the rocket body 1, and the connection is positioned obviously higher than the center of gravity of the rocket body 1, that helps to orient the rocket to an attitude which is suitable for each deceleration mechanism to decelerate the rocket during recovery. A deceleration mechanism is installed on each side wing 2, and the deceleration mechanism comprises one or more parachute mechanisms 5, and a parachute mechanism 5 comprises a pair of deceleration planks 51 installed on both sides of the side wing 2 (FIG. 3). One end of the deceleration plank 51 is connected to the upper half of the side wing 2 with a second folding joint 52; the second folding joint 52 comprises a drive device, the drive device can push the deceleration plank 51 from folded to unfolded. Each deceleration plank comprises a grid frame 54 and one or more flow-adjusting vanes 55 (FIG. 4); there are one or more square air vents 541 on the grid frame 54, Each air vent 541 is configured with a flow-adjusting vane 55, and the flow-adjusting vane 55 comprises a vane bearing 551. The inner wall of each air vent 541 has two holes 542 matching the vane bearing 551, and the vane bearing 551 is connected to an electric mechanism, the rotation of the electric mechanism can change the angle of the flow-adjusting vane 55; thus, the direction and magnitude of the air pressure caused by the airflow flowing through the air vent 541 acting on the flow-adjusting vane 55 can be adjusted by controlling the angle of the flow-adjusting vane 55. The function of the flow-adjusting vanes 55 is to convert part of the vertical air pressure acting on the surface of the deceleration plank 51 into a horizontal force, so that the parachute mechanisms 5 can not only decelerate the rocket but also move the rocket in horizontal directions by utilizing the air resistance. The propulsion system comprises several rocket engines 12 arranged at the bottom of the rocket body 1, and the rocket engines 12 are used to decelerate the rocket to the speed required for soft landing before the rocket lands on the ground.

The differences between this embodiment and embodiment 1 are as follows. In this embodiment, the only deceleration mechanism installed on each side wing 2 is the parachute mechanism 5; while the deceleration mechanism in embodiment 1 comprises a turbine engine 3 and a propeller 4, the parachute mechanism 5 is just an extra deceleration mechanism that strengthens the deceleration effect. The air pressure acting on the parachute mechanisms 5 results from the rocket's motion with respect to the air, so only the parachute mechanisms 5 are not enough to decelerate the rocket to a speed of near zero; therefore, in this embodiment, it is necessary to utilize the rocket engines 12 to decelerate the rocket to a speed of near zero when it lands on the ground. In this embodiment, the advantage of only installing the parachute mechanisms 5 on the side wings 2 is to get rid of the complex structure of the turbine engines 3 and the propellers 4, but it requires more accurate positioning and control of the rocket's falling trajectory.

The first-stage rocket of a multi-stage rocket is most commonly recovered; here we take the recovery of a first-stage rocket as an example. When the first-stage rocket has reached the predetermined altitude and has separated from the second-stage rocket, the first-stage rocket continues to rise inertially for a while following its ballistic trajectory, and turns to descend after reaching a certain height. The first-stage rocket is recovered through the following steps.

Step 1—To reorient the rocket to a nearly vertical attitude.

The control system first unfolds the deceleration planks 51 of the parachute mechanisms 5. The air density increases with the altitude decreases, the interactions between the deceleration planks 51 and the air becomes greater accordingly as the rocket descends. The side wings 2 will move backward and the center of gravity of the rocket body 1 will move forward, reorienting the rocket to a vertical attitude; that is, the rocket engines 12 at the bottom of rocket body 1 point to the direction of its motion.

Step 2—To control the flow-adjusting vanes 55 of the parachute mechanisms 5 to move the rocket towards the landing site while decelerating the rocket.

It is difficult to slow down the rocket to a speed required for soft landing with a limited area of deceleration planks 51, while the rocket engines 12 has a weak ability to move the rocket horizontally; it means that the rocket must try its best to move towards the landing site during the descent. The control system will utilize the resultant force generated by adjusting each guide vane 55 to control the horizontal motion of the rocket, allowing it to approach the landing site while falling.

Step 3—To start the rocket engines 12 to decelerate the rocket to a speed required for soft landing, and then to land the rocket on the ground.

When the falling rocket gets close to the ground, it has not been decelerated to a speed for a soft landing. The control system monitors the falling speed and altitude of the rocket, and calculates the appropriate time point to ignite the rocket engines 12 to decelerate the rocket, making sure the speed of the rocket is reduced to near zero when it lands. Then it turns off the rocket engines 12 and deploys the landing legs 11 before it lands on the ground; the landing is finished.

In addition, the control system is always monitoring the parameters such as the altitude and speed of the rocket. In step 1 and step 2 described above, if the rocket's control system thinks that the rocket is moving too fast and that threatens the structural safety of the rocket or threatens the goal of soft landing, it will ignite the rocket engines 12 at the bottom of the rocket body 1 to decelerate the rocket to insure its speed is within the required range.

I claim:

1. A recoverable rocket comprising:
   a recoverable rocket comprising a rocket body and at least two side wings, wherein:
   one end of each side wing is connected to a casing of the rocket body, and the other end is connected to a deceleration mechanism; the deceleration mechanism comprises a turbine engine and a propeller; the turbine engine is connected to the rocket body through ducts arranged in the side wing, and the rocket body supplies the energy required for the turbine engine to work; the propeller is arranged below the turbine engine, the propeller is connected to a drive shaft of the turbine engine, and the turbine engine drives the propeller to rotate in the air to generate a thrust which decelerates the rocket during recovery; the rocket body comprises a structural system, a propulsion system, a control system and a set of landing legs.

2. The recoverable rocket of claim 1 wherein one end of the side wing is connected to an upper part of the rocket body.

3. The recoverable rocket of claim 1 wherein the turbine engine is a turbine engine without an air compressor; the oxidant and fuel required for the turbine engine to work are provided by pumps installed in the rocket body, the pumps separately control the flows of the oxidant and the fuel to adjust the power of the turbine engine; the turbine engine comprises a turbine, a combustion chamber and the drive shaft; the turbine engine obtains the oxidant and fuel from the rocket body through the ducts arranged in the side wing; the high-temperature and high-pressure gas generated from the combustion reaction in the combustion chamber drives the turbine to rotate to do work; the propeller arranged below the turbine engine is driven by the drive shaft of the turbine engine.

4. The recoverable rocket of claim 1 wherein the propeller is a folding propeller, a first folding joint is arranged between the root of each blade and the drive shaft of the turbine engine.

5. The propeller of claim 4 wherein each first folding joint comprises a spring inside, and the elasticity of the spring makes the blade tend to unfold when no external force constrains it; there is a protective tube outside the propeller, and the protective tube keeps the blades folded.

6. The propeller of claim 4 wherein each first folding joint is connected to an electric drive mechanism, and the electric drive mechanism is configured to push the blade from folded to unfolded.

7. The recoverable rocket of claim 1 wherein a deceleration mechanism is installed on each side wing, the deceleration mechanism comprises one or more parachute mechanisms, and a parachute mechanism comprises a pair of deceleration planks installed on both sides of the side wing; one end of the deceleration plank is connected to the upper half of the side wing with a second folding joint and the deceleration plank is configured to move between a folded state and an unfolded state.

8. The recoverable rocket of claim 7, wherein one or more steel wires are arranged on each deceleration plank to connect with the side wing, and the side wing obliquely pulls the unfolded deceleration plank through the steel wires; with the steel wires, the air pressure on the deceleration plank is partially transferred to the side wing to prevent the second folding joint from being damaged due to excessive torsion.

9. The recoverable rocket of claim 7, wherein each deceleration plank comprises a grid frame and one or more flow-adjusting vanes; there are one or more square air vents on the grid frame, each air vent is configured with a flow-adjusting vane of the one or more flow adjusting vanes, and each flow-adjusting vane comprises a vane bearing; the inner wall of each air vent has two holes matching the vane bearing, and the vane bearing is connected to an electric mechanism, the rotation of the electric mechanism is configured to change the angle of the flow-adjusting vane; thus, the direction and magnitude of the air pressure caused by the airflow flowing through the air vent acting on the flow-adjusting vane can be adjusted by controlling the angle of the flow-adjusting vane.

10. The recoverable rocket of claim 9, wherein the grid frame is configured with the one or more square air vents, and the vane bearings of the flow-adjusting vanes of some air vents are arranged perpendicular to the vane bearings of the flow-adjusting vanes of other air vents; the grid frame is configured to generate a resultant force with a wider angle range by individually adjusting the angle of each flow-adjusting vane.

11. A method of recovering a recoverable rocket according to claim 1 comprising:
   step 1—to utilize the interaction between the deceleration mechanisms on the side wings and the air to reorient the rocket to an attitude which is suitable for each deceleration mechanism to decelerate the rocket;
   step 2—to control the powers of the turbine engines, making sure the speed of the rocket meets the requirements for a soft landing when the rocket gets near the ground;
   step 3—to move the rocket to the landing site;
   step 4—to land the rocket;
   in step 1, when it is impossible to adjust the attitude of the rocket by the interaction between the deceleration mechanisms on the side wing and the air, or the attempt to adjust the attitude is unsuccessful, a liquid nitrogen attitude adjustment system will be activated to reorient the rocket to the required attitude.

12. The method of claim 11 wherein step 2 and step 3 can be carried out synchronously, so that the recoverable rocket can move towards the landing site during the descent.

13. A recoverable rocket comprising:
   a recoverable rocket comprising a rocket body and two side wings, wherein:
   the rocket body comprises a structural system, a propulsion system, a control system and a set of landing legs; one end of each side wing is connected to the upper half of the rocket body to orient the rocket to an attitude which is suitable for each deceleration mechanism to decelerate the rocket during recovery; a deceleration mechanism is installed on each side wing, and the deceleration mechanism comprises one or more parachute mechanisms, and a parachute mechanism comprises a pair of deceleration planks installed on both sides of the side wing; one end of the deceleration plank is connected to the upper half of the side wing with a second folding joint; each deceleration plank comprises a grid frame and one or more flow-adjusting vanes; there are one or more square air vents on the grid frame, each air vent is configured with a flow-adjusting vane of the one or more flow adjusting vanes, and the flow-adjusting vane comprises a vane bearing; the inner wall of each air vent has two holes matching the vane bearing, and the vane bearing is connected to an electric mechanism, the rotation of the electric mechanism is configured to change the angle of the flow-adjusting vane; thus, the direction and magnitude of the air pressure caused by the airflow flowing through the air vent acting on the flow-adjusting vane can be adjusted by controlling the angle of the flow-adjusting vane; the function of the flow-adjusting vanes is to convert part of the vertical air pressure acting on the surface of the deceleration plank into a horizontal force, so that the parachute mechanisms is configured to not only decelerate the rocket but also move the rocket in horizontal directions by utilizing the air resistance; the propulsion system comprises several rocket engines arranged at the bottom of the rocket body, and the rocket engines are used to decelerate the rocket to the speed required for soft landing before the rocket lands on the ground.

* * * * *